United States Patent [19]

Champseix

[11] Patent Number: 4,922,947

[45] Date of Patent: May 8, 1990

[54] AUTOMATIC MEMBRANE DRAIN DEVICE FOR PNEUMATIC CIRCUITS

[75] Inventor: Serge Champseix, Les Mureaux, France

[73] Assignee: ABX, Sartrouville, France

[21] Appl. No.: 224,710

[22] Filed: Jul. 27, 1988

[30] Foreign Application Priority Data

Jul. 28, 1987 [FR] France .............................. 87 10679

[51] Int. Cl.$^5$ .......................... F16T 1/14; F16K 15/14
[52] U.S. Cl. ..................................... 137/204; 137/859
[58] Field of Search ............... 137/102, 204, 512.4, 137/859; 251/61.1, 61.2

[56] References Cited

U.S. PATENT DOCUMENTS

| 259,682 | 6/1882 | Gruber | 137/859 |
|---|---|---|---|
| 2,232,899 | 2/1941 | Aikman | 137/204 |
| 2,739,605 | 3/1956 | Smith | 137/204 |
| 2,793,649 | 5/1957 | Hamer | 137/204 |
| 2,939,477 | 6/1960 | Kaldobsky | 137/204 |
| 3,084,707 | 4/1963 | Frye | 137/102 |
| 3,682,194 | 8/1972 | Pyle | 137/204 |
| 3,977,426 | 8/1976 | Pyle | 137/204 |
| 4,182,355 | 1/1980 | Briel et al. | 137/859 |
| 4,646,781 | 3/1987 | McIntyre et al. | 137/859 |
| 4,712,583 | 12/1987 | Pelmulder et al. | 137/859 |

FOREIGN PATENT DOCUMENTS

| 1408859 | 4/1902 | France . |
| 1268227 | 9/1959 | France . |
| 2220741 | 10/1974 | France . |

*Primary Examiner*—George L. Walton
*Attorney, Agent, or Firm*—Fleit, Jacobson, Cohn, Price, Holman & Stern

[57] ABSTRACT

The invention provides an automatic drain device with membrane for pneumatic circuits. A flexible membrane (11) which separates the opening (2) of a jar (1) from a drain pipe (6) is precurved in a top position against this opening and against a skull-cap (8) against which it bears, which skull-cap then closes a communication orifice (14) provided on one side of the membrane. Under the action of the pressure in the jar, the membrane moves down to come to bear against a discharge end-piece (5) freeing, during this movement, orifice (14) and making drainage possible.

5 Claims, 1 Drawing Sheet

U.S. Patent    May 8, 1990    4,922,947
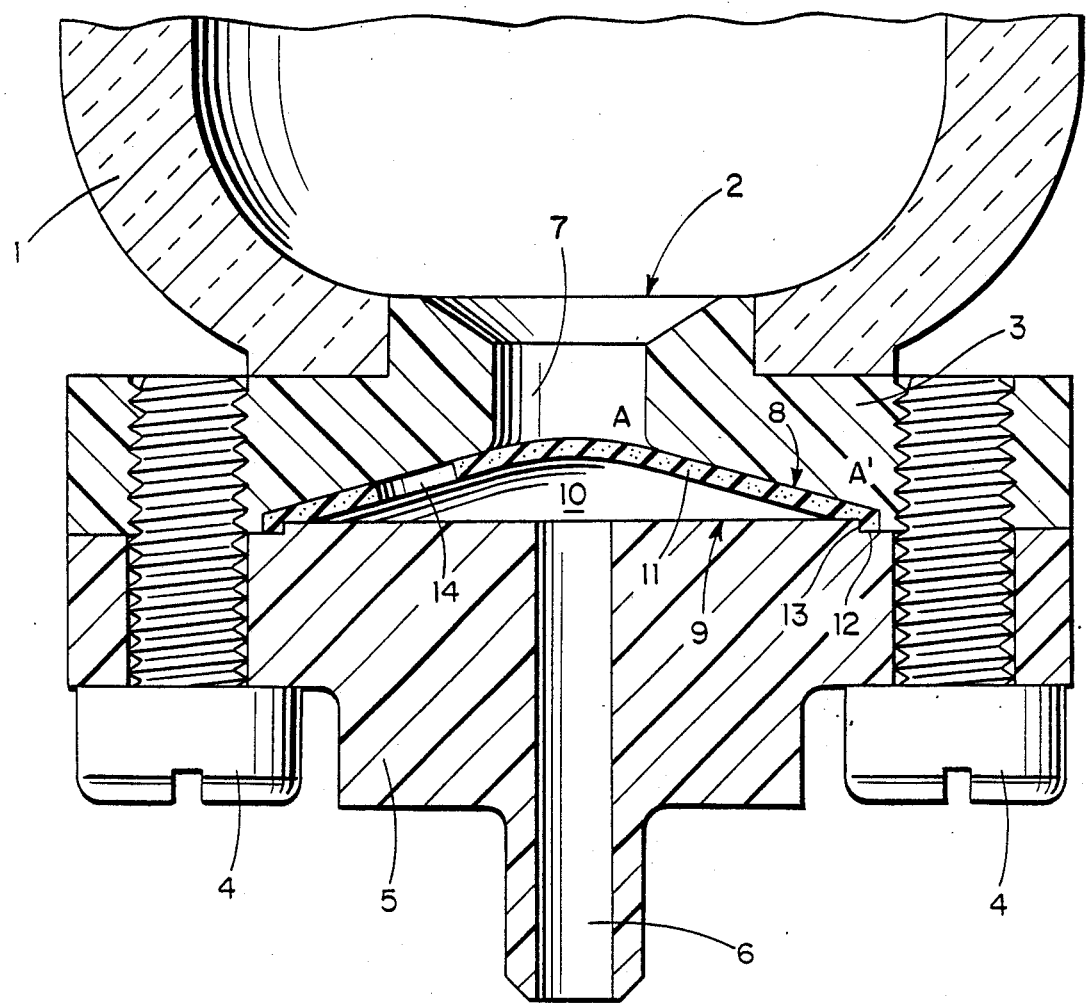

though slow, the water contained in the intermediate chamber 10 is pushed by the membrane and escapes through orifice 14, the latter being now uncovered by the surface AA'. The emptying of the jar 1 is at this moment accomplished.

AUTOMATIC MEMBRANE DRAIN DEVICE FOR PNEUMATIC CIRCUITS

BACKGROUND OF THE INVENTION

1. Field of the Invention

The invention which relates to an automatic drain device for pneumatic circuits concerns more particularly a membrane device advantageously replacing valve systems and finds a preferred application in circuits supplying automatic medical analysis apparatus with compressed air.

Compressed air circuits which feed apparatus comprising for examle pneumatic valves usually include filters for blocking the impurities which might disturb the operation and sealing of the valves. Each feed circuit is also provided with a jar in which the air penetrates before passing thorough the filter and reaching the valves, which jar makes possible condensation of the water vapor with which the compressed air is laden. It is in fact desirable to eliminate this water vapor which is a source of oxidation of the mechanical parts met with. The condensed water is collected by the jar and must be removed either continuously or episodically.

2. Description of the Prior Art

Manual drain devices are known which consist of a simple closure valve placed at the base of the jar and operated by a push button against the return force of a spring. It is of course necessary to operate them whenever required and that imposes on the user frequent supervision which is then a constraint, this is why this manual solution is very often replaced by an automatic drain device. There exists a system which consists in providing in this jar a small calibrate and constant leak aperture, through which the water escapes continually. But the aperture also creates an air leak which may seem negligible for high compressed air pressures but which is inadmissible in the case of lower pressures. It is then preferable to use a valve device urged to an open position by a spring and which is closed when the air pressure is established in the jar. As soon as the compressed air feed is interrupted, the valve opens again and the water may flow out of the jar. This arrangement uses essentially metal mechanical parts which may also oxidize and become rapidly defective. Furthermore, although the valve closes correctly at high pressures it is much more haphazard for low pressures.

An automatic drain device is further known which uses a valve mounted on a rod sliding in the jar and separating two chambers, a lower chamber communicating with the outside and an upper chamber recovering the condensed water and releases it to the lower chamber when a certain pressure is established above the valve. This system is not wholly satisfactory either, for it is difficult to use and to adjust.

SUMMARY OF THE INVENTION

To overcome these drawbacks, one object of the present invention is therefore to provide a device which operates reliably, is easy to use, is of a low cost price and can be very readily fitted to a drain jar, known per se, usually used in numerous appliances and more precisely in those having a pneumatic circuit for feeding compressed air at a relatively low pressure.

For this, the invention provides then an automatic drain device for pneumatic circuits, comprising a mobile mechanism providing drainage of the water from a jar collecting the condensed water from the compressed air taken into the circuit, which mechanism episodically makes it possible to remove the water from the jar through a lower opening, during a change of the air pressure, in which device said mobile mechanism is a flexible membrane which separates the opening of the jar from a drain pipe which is precurved in a top position against said opening and against a bearing face surrounding it and which is provided with an offcentered orifice covered by said bearing face, in which device a membrane also moves between this top portion and a low position in which it closes the drain pipe, the offcentered orifice being uncovered when the membrane passes from one to the other of these two positions.

BRIEF DESCRIPTION OF THE DRAWING

Other particular features will be clear from the following description with reference to the accompanying drawing which shows a sectional view of one non limitative embodiment of the drain device.

DESCRIPTION OF THE PREFERRED EMBODIMENT

In the drawing the bottom of a drain jar 1 has been shown with a discharge orifice 2. On this bottom is bonded a base 3 connected by a set of screws 4 to a discharge end-piece 5 through which passes a drain pipe 6. Base 3 fits orifice 2 and also had a cylindrical opening 7 coaxial with the orifice 2, which, at mid height of the thickness of the base, opens out laterally so as to form a skull-cap 8 whose other face AA' is slightly slanted with respect to the horizontal. Between the horizontal upper face 9 of end-piece 5 and the skull-cap is defined an intermediate chamber 10 between orifice 2 and the drain pipe 6.

A flexible membrane 11 is nipped between base 3 and end-piece 5 by its annular flange 12 which is placed between a shoulder 13 on the upper face 9 of the end-piece and the edge A of the skull-cap 8. The diameter of the membrane is slightly larger than that taken at the edge of the skull-cap. Thus, when being assembled, the membrane undergoes a slight stress which curves it upwards and applies it against the wall AA' of the skull-cap. Sealing is provided at this level by clamping the end-piece against the base by means of screws 4. In a side zone away from opening 7 the membrane is provided with a small orifice 14.

The drawing shows the membrane in the top position occupying a curved position in which its natural conformation holds it against the skull-cap 9, orifice 14 being closed by the part AA' thereof and opening 7 by the membrane itself. The water which the jar 1 possibly contains cannot then flow out, its weight being insufficient to cause inflection of the membrane.

As soon as the apparatus is set in operation and as soon as an air pressure is established in the jar, the membrane is pushed downwards and moves orifice 14 away from the skull-cap. The water may flow through pipe 6, such flow being promoted by the air overpressure. At the end of its downward movement, the membrane is applied against the horizontal upper face 9 of end-piece 5 and closes the drain pipe 6. During operation, the water again accumulates above the membrane. But as soon as the compressed air pressure is interrupted, the membrane resumes its first position because of its elasticity and its pre-stress. During this rising movement, orifice 14 is again uncovered and complementary water drainage is provided.

The drain device advantageously made from materials withstanding aggressive fluids, uses only a small sized membrane as moving member; it is particularly suitable for apparatus using relatively low compressed air pressures such as medical analysis equipment.

What is claimed is:

1. An automatic drain device for a pneumatic circuit for draining water from a collecting jar generated by compressed air admitted into the circuit, said device comprising:

a drain pipe connected to an opening of said collecting jar;

a flexible membrane positioned between the drain pipe and the opening of said collecting jar, said membrane being pre-curved to adopt a first position against a precurved bearing face surrounding said opening of said drain pipe, said membrane having an off-centered orifice not in line with said opening and covered by said bearing face when said membrane is in said first position, said membrane adopting a second position against an opening of said drain pipe, and whereby said membrane moves between said first and second positions upon air pressure being intermittently established in said collecting jar so that said off-centered orifice becomes uncovered to allow intermittent draining of water, said drain pipe includes a base member attached directly to the opening of said collecting jar between said drain pipe and said collecting jar and having an opening coaxial with the opening of said collecting jar and a discharge end-piece attached directly to said base member to which said drain pipe is attached to align with the opening of said collecting jar intermittently upon the application of the compressed air in said collecting jar prior to said membrane engaging a flat interior surface of said discharge end-piece in the second position to intermittently close off the off-centered orifice to stop the draining of the water to said drain pipe, said base member and said discharge end-piece forms a drain chamber therebetween, and said membrane being secured between said base member and said discharge end-piece.

2. The drain device of claim 1, wherein said pre-curved bearing face of said base member widens laterally to form a skull-cap shaped surface including an upper face being slightly slanted with respect to the horizontal, said upper surface forming said bearing face surrounding said opening.

3. The drain device of claim 2, wherein said membrane includes an annular flange, said flange being placed between a shoulder of said discharge end-piece and an edge of said skull-cap shaped surface.

4. The drain device of claim 2, wherein the diameter of said membrane is slightly greater than the diameter of said skull-cap shaped surface thus forcing said membrane against said bearing face.

5. The drain device of claim 1, and further comprising sealing screws for clamping said discharge end-piece and said base member together.

* * * * *